(12) United States Patent
Kim et al.

(10) Patent No.: US 7,197,345 B2
(45) Date of Patent: Mar. 27, 2007

(54) REPLACEABLE SLIDING COVER UNIT FOR FOLDER IN FOLDER-TYPE PORTABLE PHONE

(75) Inventors: Yong-Jae Kim, Suwon-shi (KR); Tae-Joong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 749 days.

(21) Appl. No.: 09/992,933

(22) Filed: Nov. 5, 2001

(65) Prior Publication Data

US 2003/0008677 A1 Jan. 9, 2003

(30) Foreign Application Priority Data

Jul. 7, 2001 (KR) ................. 2001-40622

(51) Int. Cl.
*H04B 1/38* (2006.01)
(52) U.S. Cl. ............... 455/575.3; 455/575.1; 455/575.4; 455/575.8
(58) Field of Classification Search .......... 455/575.1, 455/575.3, 575.4, 575.8, 90.3, 575.6; 379/428.01
See application file for complete search history.

(56) References Cited

U.S. PATENT DOCUMENTS

| | | | | |
|---|---|---|---|---|
| 5,848,152 A | * | 12/1998 | Slipy et al. ............ | 379/433.13 |
| 6,370,362 B1 | * | 4/2002 | Hansen et al. ............ | 455/90.1 |
| 6,594,472 B1 | * | 7/2003 | Curtis et al. ............ | 455/575.8 |
| 6,625,425 B1 | * | 9/2003 | Hughes et al. ............ | 455/90.3 |
| 6,847,806 B2 | * | 1/2005 | Curtis et al. ............ | 455/90.3 |
| 6,980,840 B2 | * | 12/2005 | Kim et al. ............... | 455/575.4 |
| 2002/0076512 A1 | * | 6/2002 | Kreider ..................... | 428/34.1 |
| 2002/0119801 A1 | * | 8/2002 | Nemoto et al. ............ | 455/550 |
| 2002/0197965 A1 | * | 12/2002 | Peng .......................... | 455/90 |
| 2004/0018863 A1 | * | 1/2004 | Engstrom et al. ........ | 455/575.8 |

FOREIGN PATENT DOCUMENTS

| | | | |
|---|---|---|---|
| CN | 2250600 | | 3/1997 |
| KR | 2001082904 A | * | 8/2001 |
| KR | 10-2002-0078050 | | 10/2002 |
| WO | WO 00/56040 | | 9/2000 |

OTHER PUBLICATIONS

Chinese Office Action dated Dec. 5, 2003 issued in a counterpart application, namely, Appln. No. 02102005.1.

* cited by examiner

*Primary Examiner*—Matthew D. Anderson
*Assistant Examiner*—Tuan Pham
(74) *Attorney, Agent, or Firm*—The Farrell Law Firm

(57) ABSTRACT

There is provided a replaceable sliding cover unit for a folder-type phone having a main body, a folder, and a hinge device for connecting the folder to the main body rotatably. A slot is formed around the periphery of the folder. A replaceable sliding cover, having a window at a predetermined position, is mounted along the slot to cover the upper portion of a folder case and detachable from the folder by sliding in the length direction of the folder-type phone. A raised edge and a locking unit fixes the cover in the slot.

7 Claims, 10 Drawing Sheets

REPLACEABLE SLIDING COVER UNIT FOR FOLDER IN FOLDER-TYPE PORTABLE PHONE

PRIORITY

This application claims priority to an application entitled "Exterior Changeable Portable Phone" filed in the Korean Industrial Property Office on Jul. 7, 2001 and assigned Serial No. 2001-40622, the contents of which are hereby incorporated by reference.

BACKGROUND OF THE INVENTION

1. Field of the Invention

The present invention relates generally to a folder-type phone, and in particular, to a replaceable sliding cover unit by which the exterior color of a folder-type phone can be changed.

2. Description of the Related Art

Portable phones are usually categorized into a bar type, a flip type, and a folder type according to their appearances and into a wrist type and a neck wearable type according to where they are carried. Or, according to their functions, they are divided into phones for voice communication, for picture transmission and reception, and for Internet access. Along with the advent of a multimedia era, more portable multifunctional phones will be used.

At present, bar-type phones, flip-type phones, and folder-type phones are widely used. Among them, the flip type and the folder type are more popular due to their small size and lightweight bodies.

A known folder-type phone, for example, is comprised of a main housing, a folder, and a hinge device that connects the main housing to the folder in such a manner that the folder rotates up to a speech angle with respect to the main housing. Needless to say, the main housing is provided with a microphone and the folder with a speaker. The structure of this conventional folder-type phone is well known to those skilled in the art.

A keypad with a plurality of keys is used for data input and an LCD (Liquid Crystal Display) for data output portion for the conventional portable phone. A touch screen or a touch pad is also used for data input.

The conventional folder-type phone, however, has a drawback in that its exterior is generally fixed in a single color. In view of its structure of being rotatably connected to the main body by the hinge device, the folder itself cannot be replaced. If necessary, an expert should deal with it. On the user side, once a portable phone is purchased, its color cannot be changed. Therefore, the user may become bored with the color of the portable phone.

SUMMARY OF THE INVENTION

It is, therefore, an object of the present invention to provide a replaceable sliding cover unit by which can be changed in a folder-type phone.

The foregoing and other objects can be achieved by providing a replaceable sliding cover unit for folder-type phone having a main body, a folder, and a hinge device for rotatably connecting the folder to the main body. A slot is formed around the periphery of the folder. A replaceable sliding cover, having a window at a predetermined position, is mounted along the slot to cover the upper portion of a folder and detachable from the folder by sliding in the length direction of the folder-type phone. A raised edge and a locking unit fixes the cover in the slot.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
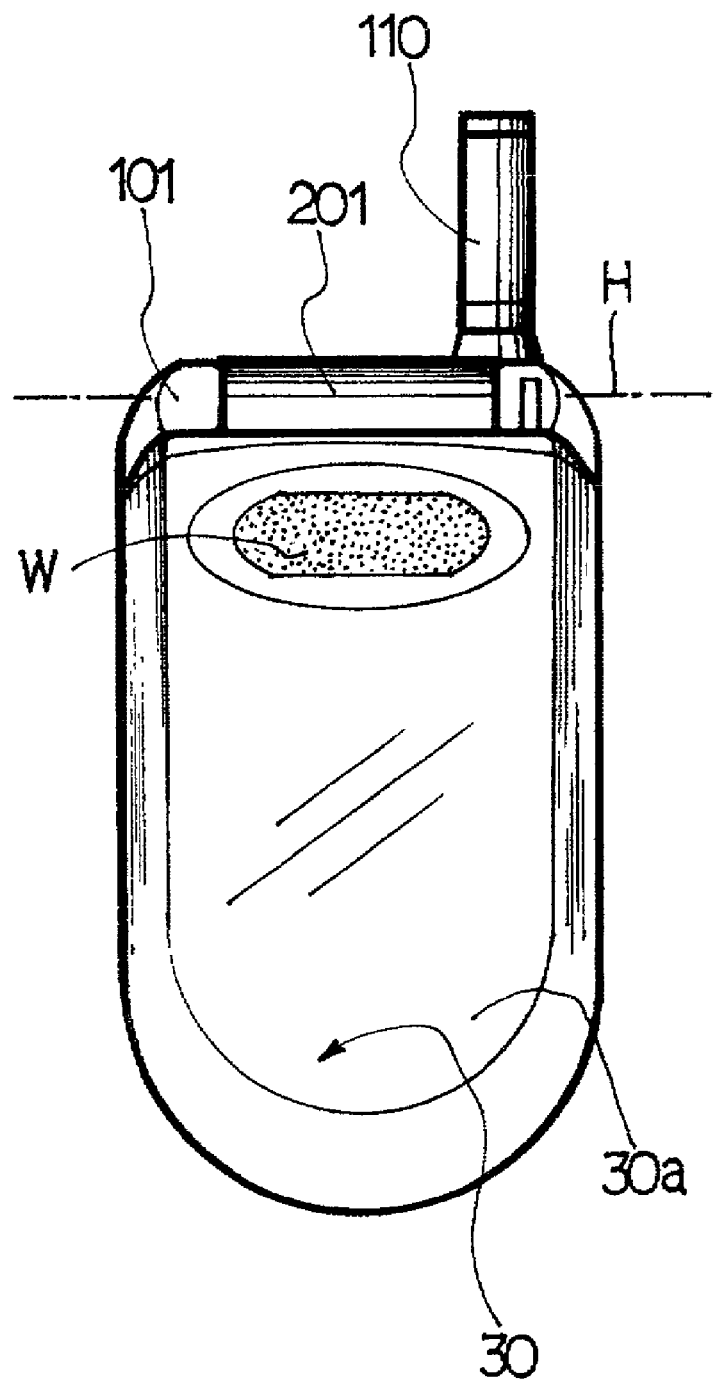
FIG. 1 is a plan view of a folder-type phone with a replaceable sliding cover in a closed state according to an embodiment of the present invention.
Figure 2:
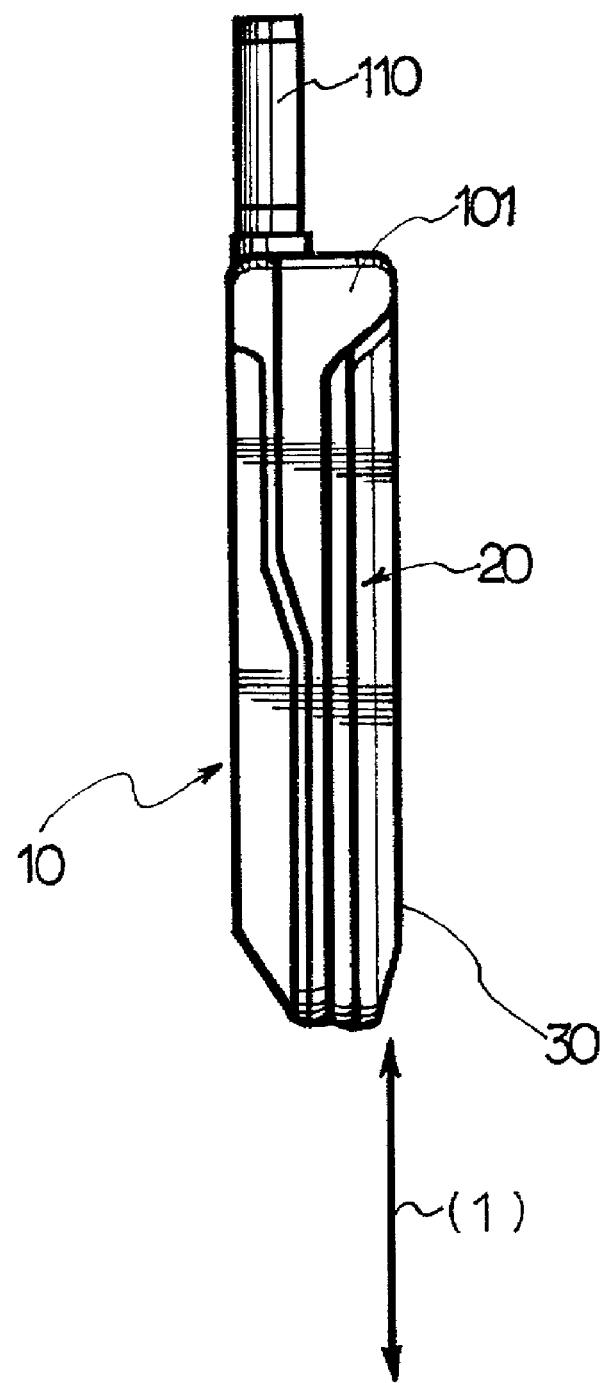
FIG. 2 is a side view of the folder-type phone shown in FIG. 1.

While it is to be appreciated that the present invention is applicable to any folder-type phone, embodiments of the present invention will focus narrowly on the folder of the folder-type phone as shown in FIGS. 1 and 2.

Referring to FIGS. 1 and 2, the folder-type phone is comprised of a main body 10, a folder 20, and a hinge device (not shown) that rotatably connects the folder 20 to the main body 10. Cover 30 is shown in FIGS. 1 and 2. Also shown is antenna 110. Since FIG. 1 shows the state where the folder 20 is closed to the main body 10, the main body 10 is covered with the folder 20, and only the sides of hinge arm 101 are shown protruding in both directions from the main body 10.

A center hinge arm 201 is used to connect the folder 20 to the side hinge arm 101 rotatably on a hinge axis H: A hinge module (not shown) is mounted inside the center hinge arm 201. Generally, the folder 20 is able to be opened to about 135° to 150° on the hinge axis H. Window W is shown on the cover 30. Cover 30 has a front side 30a.

Figure 3:
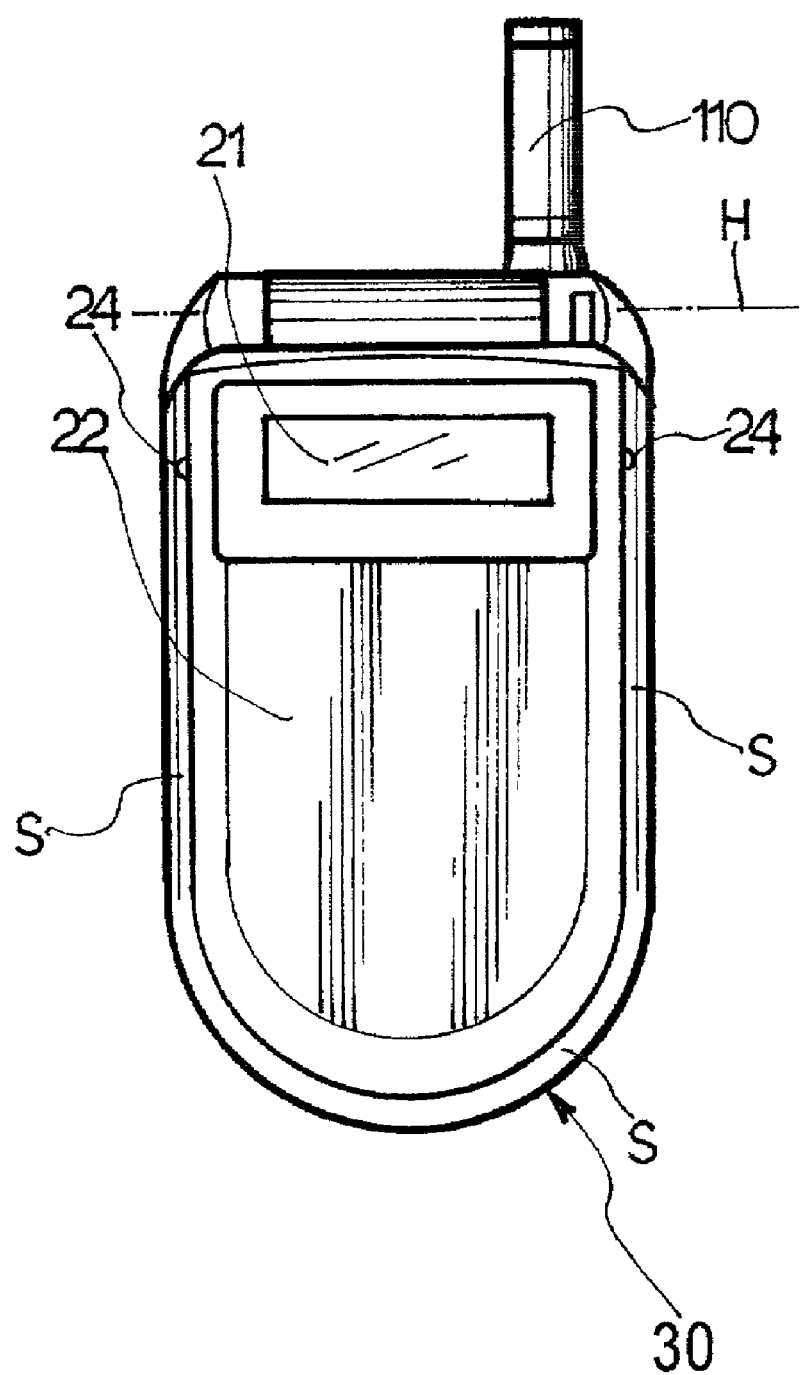
FIG. 3 is a plan view of the folder-type phone with the replaceable sliding cover removed according to the embodiment of the present invention.
Figure 4:
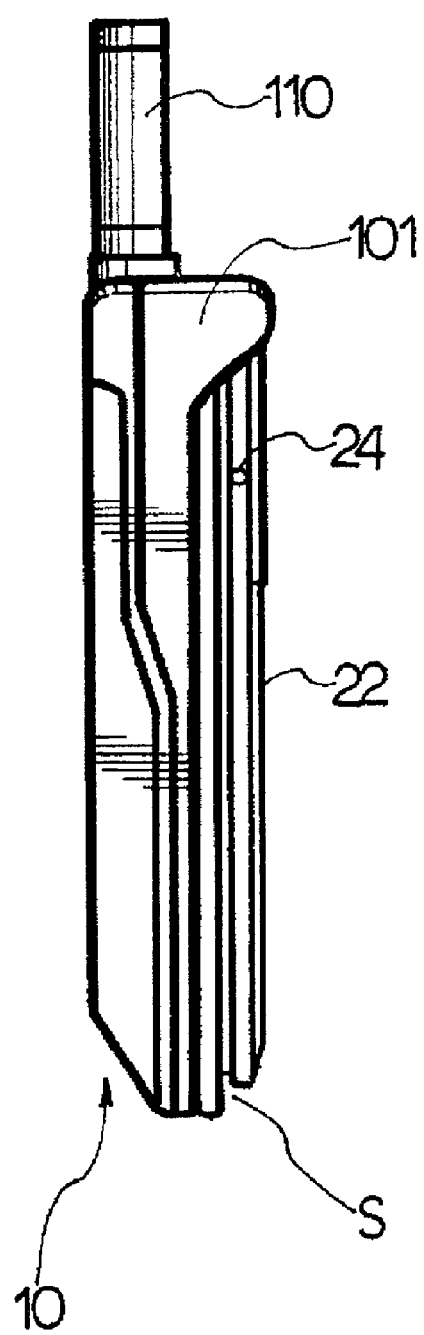
FIG. 4 is a side view of the folder-type phone shown in FIG. 3.
Figure 5:
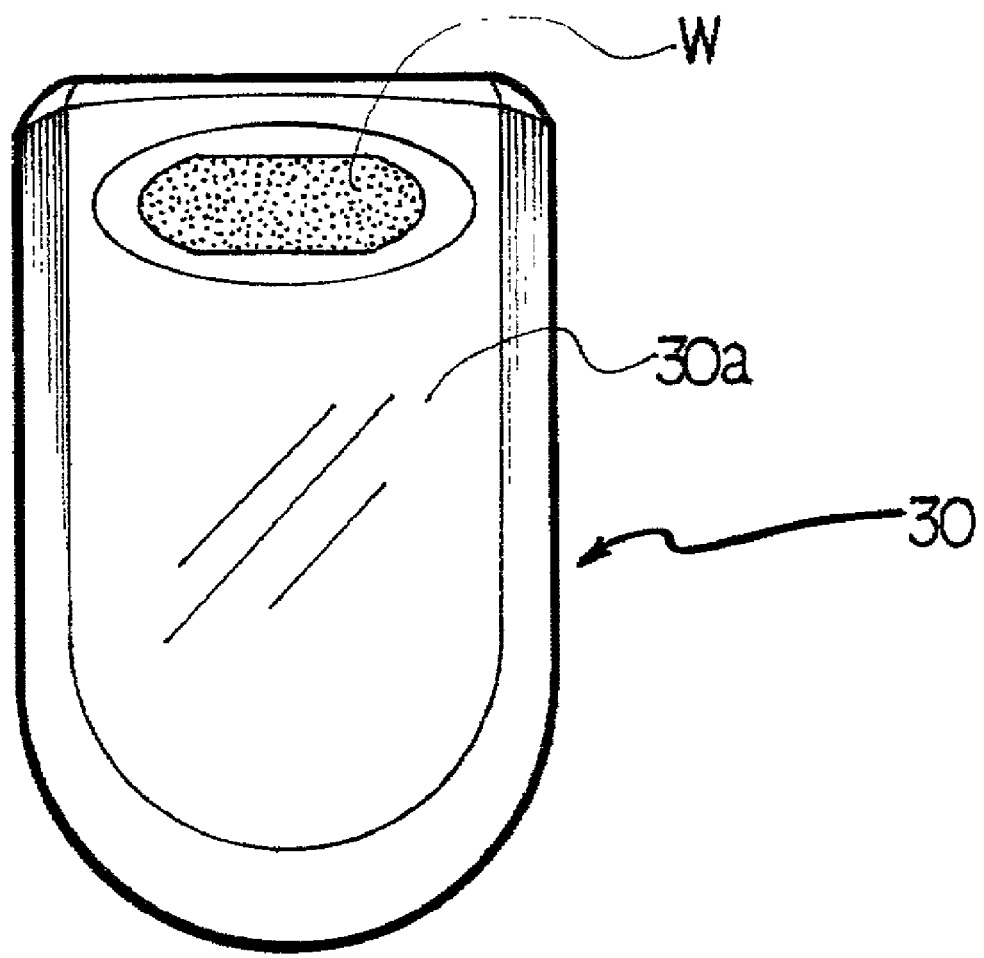
FIG. 5 is a plan view of the replaceable sliding cover according to the embodiment of the present invention.

Referring to FIGS. 3 and 4, the folder 20 has a case 22 for protecting at least one LCD (a main LCD (not shown) and a sub-LCD 21), an FPCB (Flexible Printed Circuit Board), a speaker (not shown) and a vibrator (not shown) therein, and a replaceable sliding cover 30 that is removable from the case 22. The sub-LCD 21 is shown to be provided with the folder 20, while the main LCD, the FPCB, the speaker, and the vibrator, which are mounted in the main body 10, are not shown in the figures. Window W allows viewing of sub-LCD 21 through cover 30.

Referring to FIG. 4, a slot S is formed around the outer circumference of the folder 20. The replaceable sliding cover 30 is mounted to cover the upper portion of the folder 20 along the slot S. More specifically, the cover 30 is combined with the case 22 in a sliding manner to cover the upper portion of the case 22. Here, the cover 30 can be removed from the folder 20, by sliding it in the lengthwise direction of the phone, that is, in a direction indicated by reference numeral (1) in FIG. 2. The cover 30 includes a locking unit and at least one raised edge 32 to maintain the mounted state of the cover 30 to the folder 20.

Referring to FIGS. 3 to 7, the locking unit functions to fix the cover 30 in the slot S after the cover 30 is inserted along the slot S. The locking unit is comprised of protrusions 24 at both sides of the case 22 and grooves 34 formed at predetermined positions of the raised edge 32, for holding the protrusions 24. The protrusions 24 are near to the slot S, more specifically in the vicinity of the center hinge arm 201 The grooves 34 are disposed at positions corresponding to the protrusions 24.

Figure 6:
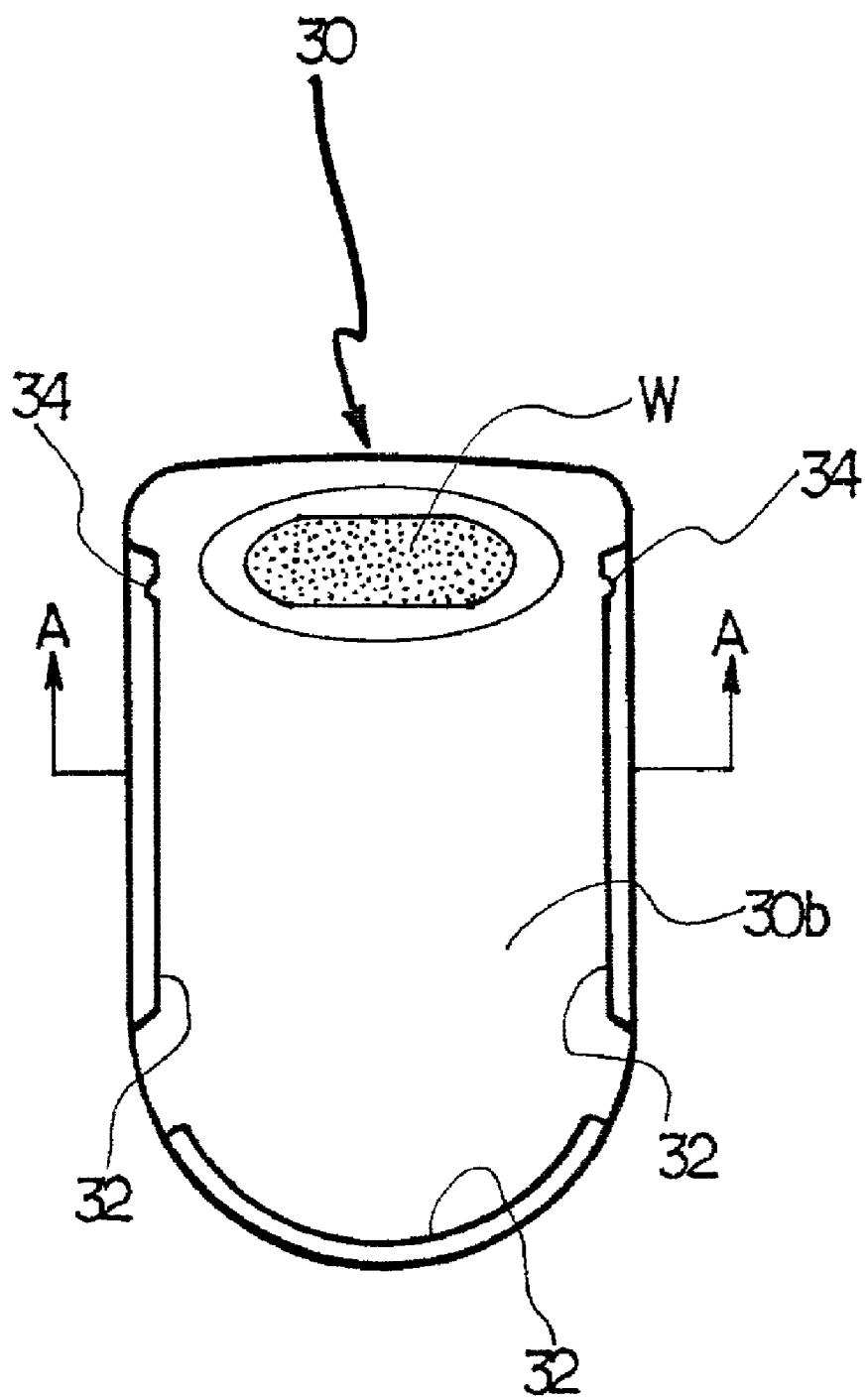
FIG. 6 is a bottom view of the replaceable sliding cover according to embodiment of the present invention.
Figure 7:
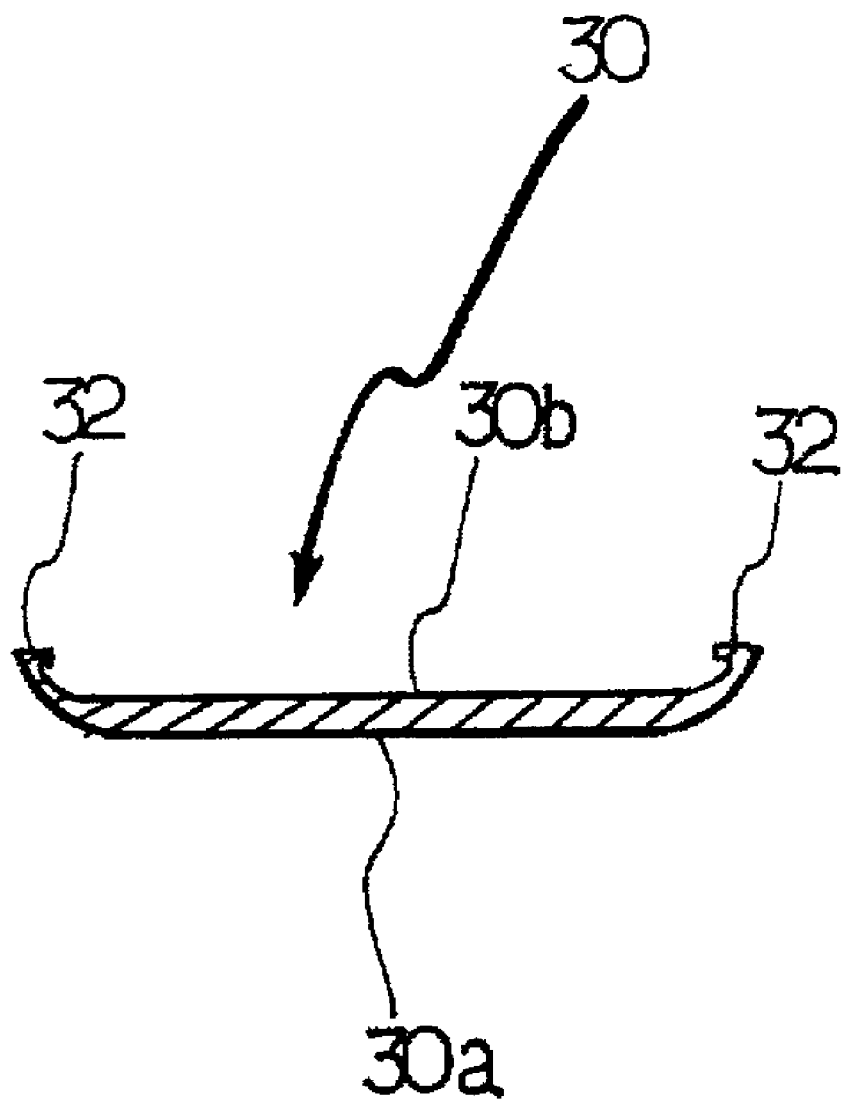
FIG. 7 is a sectional view of the replaceable sliding cover shown in FIG. 6, taken along line A—A.

The at least one raised edge 32 are formed at predetermined intervals along the periphery of the cover 30. The raised edge 32 according to the present invention holds the cover 30 to the folder 20. Also shown in FIG. 6 is rear side 30b of cover 30.

Figure 8:
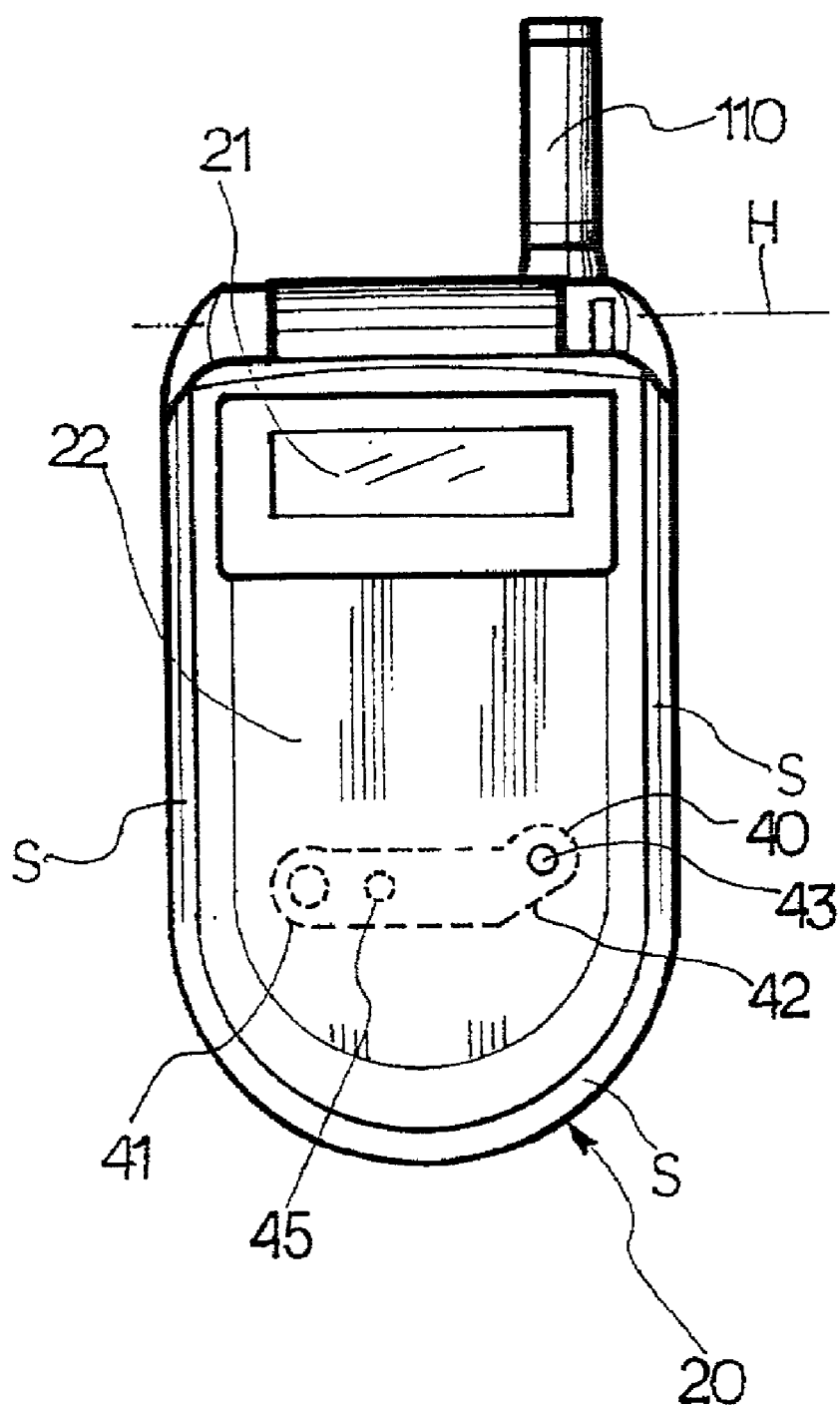
FIG. 8 is a plan view of a folder-type phone with a replaceable sliding cover, from which the replaceable sliding cover is removed according to another embodiment of the present invention.
Figure 9:
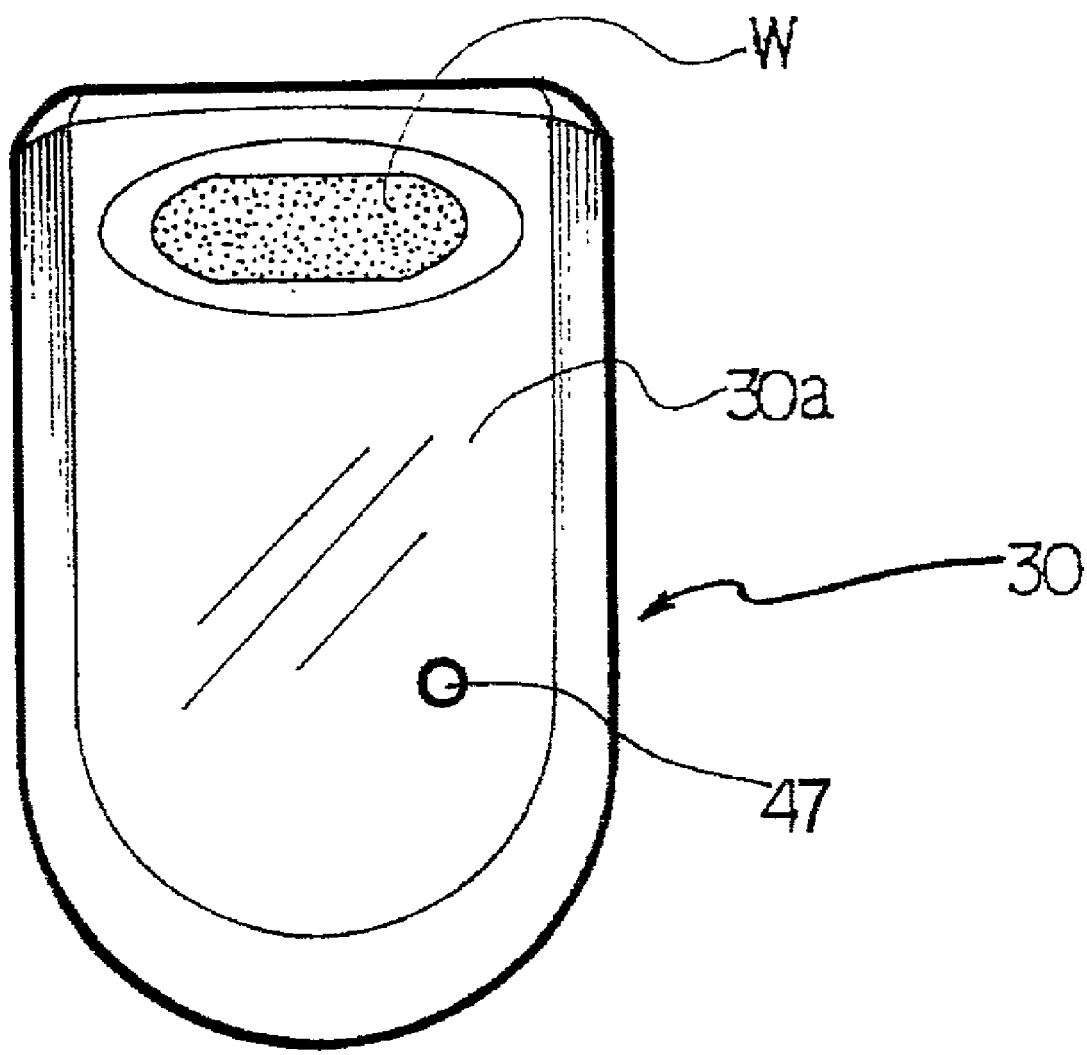
FIG. 9 is a plan view of the replaceable sliding cover according to the second embodiment of the present invention.
Figure 10:
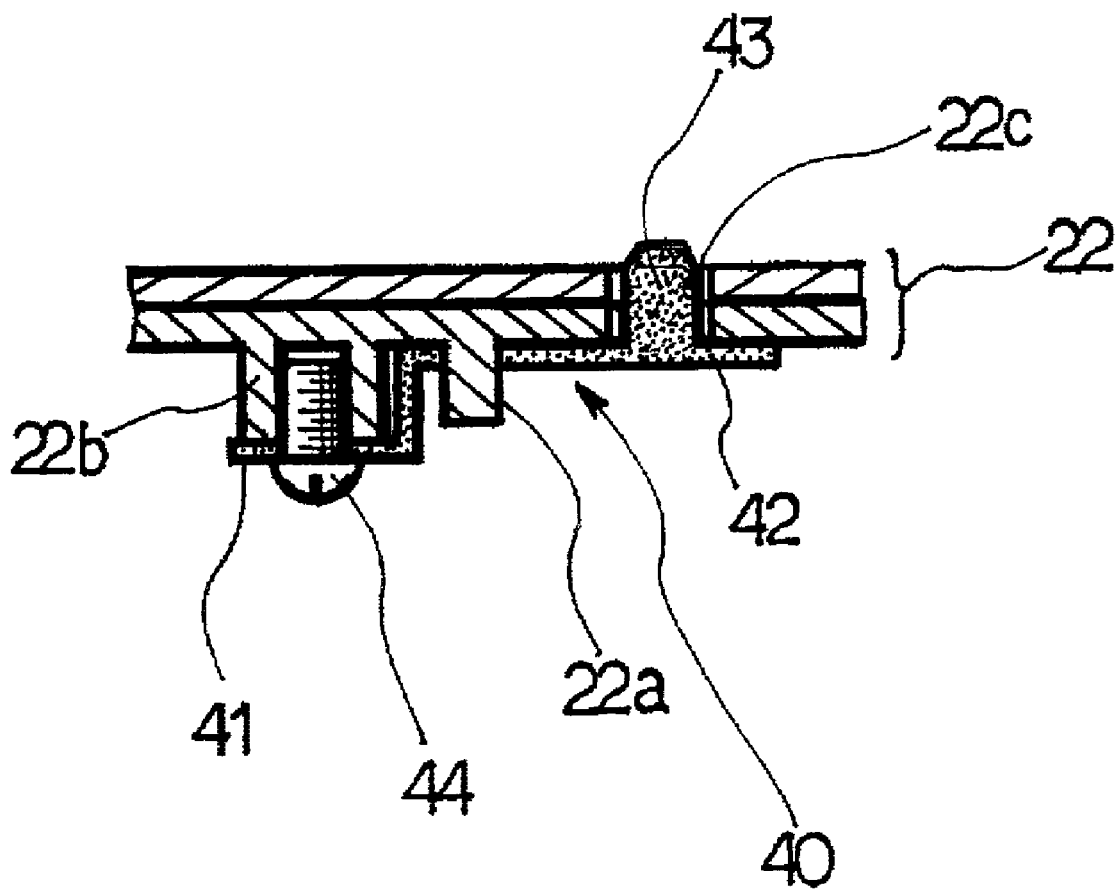
FIG. 10 is a sectional view of a locking unit shown in FIG. 8.

Now there will be given a description of a folder-type phone with a replaceable sliding cover according to another embodiment of the present invention with reference to FIGS. 8, 9, and 10. The replaceable sliding cover according to the second embodiment is the same as that according to the first embodiment except that it has a different locking unit.

In the second embodiment of the present invention, a different locking unit is used to secure the replaceable sliding cover 30 to the case 22 of the folder 20. The locking unit 40 is set to a locking state or a locking release state with the aid of the elasticity of a plate spring 40. Specifically, the locking unit 40 includes a fixed end 41 and a free end 42. The fixed end 41 is fixed to the bottom surface of the case 22 by a screw 44 and the free end 42 has a protrusion 43. The protrusion 43 is disposed in an opening 22c formed into the case 22 to move up and down according to whether the replaceable sliding cover 30 is pushed onto the folder 20 or pulled away from the folder 20. As shown in FIG. 9, a case opening 47 is formed at a predetermined position of the replaceable sliding cover 30 so that the protrusion 43 is inserted through opening 22c and into case opening 47 to affix the replaceable sliding cover 30.

When the replaceable sliding cover 30 is pushed slidingly onto the case 22, the protrusion 43 moves slightly down and the upper end of the protrusion 43 contacts the bottom surface of the replaceable sliding cover 30. Then, when the protrusion 43 is inserted into the case opening 47, the replaceable sliding cover 30 is locked in the case 22. On the contrary, to detach the replaceable sliding cover 30 from the case 22, it is pulled. At the same time, the bottom surface of the replaceable sliding cover 30 slides over the protrusion 43 and the protrusion 43 slides off from case opening 47. By pulling the replaceable sliding cover 30 further, it is completely removed from the case 22.

Case 22 further includes a guide 22a protruded from the bottom surface of the case 22 that is inserted into hole 45 of plate spring 40, to guide the protrusion 43 stably up and down. Reference numeral 22b indicates an engagement boss for engaging screw 44.

In accordance with the present invention, a user can carry a plurality of covers to change the color or pattern of the exterior of a folder-type phone since the covers are so configured as to be replaceable from the folder.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A replaceable sliding cover unit for a folder-type phone having a main body, a folder, a hinge device for rotatably connecting the folder to the main body, and a display, comprising:
   a slot formed around the periphery of the folder;
   a replaceable sliding cover having at least one raised edge for mating with the slot to cover the upper portion of a folder, and detachable from the folder by sliding the replaceable sliding cover in the length direction of the folder-type phone; and
   a locking unit for fixing the cover in the slot.

2. The replaceable sliding cover unit of claim 1, further comprising a transparent window positioned to enable viewing of the display when the replaceable sliding cover is mounted to the folder.

3. The replaceable sliding cover unit of claim 1, wherein the locking unit comprises: a groove formed along the slot; and protrusions formed at the periphery of the cover to mate with the groove.

4. The replaceable sliding cover unit of claim 1, wherein the locking unit comprises: protrusions formed to face each other at both sides of the folder case; and grooves at positions of the raised edge corresponding to the protrusions.

5. The replaceable sliding cover unit of claim 4, wherein the protrusions are formed near a center hinge arm of the folder.

6. The replaceable sliding cover unit of claim 1, wherein the locking unit comprises:
   a plate spring having a fixed end fixed to a bottom surface of the folder and a free end having a protrusion, the protrusion disposed through an opening of the folder to move up and down according to whether the replaceable sliding cover is detached from the folder or mounted onto the folder; and
   an opening formed at a predetermined position of the replaceable sliding cover to mate with the protrusion of the free end so that the replaceable sliding cover is secure to the folder.

7. The replaceable sliding cover unit of claim 6, wherein the plate spring further comprises a guide protruded from the bottom surface of the folder case to guide the motion of the plate spring.

* * * * *